(12) United States Patent
Hahne

(10) Patent No.: US 9,352,780 B2
(45) Date of Patent: May 31, 2016

(54) DRIVER ASSISTANCE DEVICE

(71) Applicant: GM GLOBAL TECHNOLOGY OPERATIONS LLC, Detroit, MI (US)

(72) Inventor: Uwe Hahne, Buettelborn (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/554,985

(22) Filed: Nov. 26, 2014

(65) Prior Publication Data
US 2015/0151790 A1    Jun. 4, 2015

(30) Foreign Application Priority Data

Nov. 30, 2013  (DE) .......................... 10 2013 020 199

(51) Int. Cl.
*B60R 16/06* (2006.01)
*B62D 15/02* (2006.01)
*G08G 1/16* (2006.01)
*B60R 21/013* (2006.01)

(52) U.S. Cl.
CPC ............ *B62D 15/0285* (2013.01); *G08G 1/168* (2013.01); *B60R 21/013* (2013.01)

(58) Field of Classification Search
CPC ... B60R 21/013; G08G 1/168; B62D 15/0285

USPC ................ 701/23, 300; 340/435, 932.2, 988, 340/425.5
See application file for complete search history.

(56) References Cited

U.S. PATENT DOCUMENTS

| | | | | |
|---|---|---|---|---|
| 4,654,834 A | * | 3/1987 | Dorr | ...................... G10K 11/28 367/140 |
| 4,937,796 A | * | 6/1990 | Tendler | ................. G01S 15/931 367/116 |
| 7,170,735 B2 | | 1/2007 | Diskin | |
| 7,869,305 B2 | * | 1/2011 | Anderson | ................ B60Q 1/48 367/909 |
| 2005/0002145 A1 | * | 1/2005 | Elon | ........................ H05F 3/02 361/212 |
| 2009/0066538 A1 | * | 3/2009 | Thomas | ............. G06Q 30/0266 340/903 |

FOREIGN PATENT DOCUMENTS

| | | |
|---|---|---|
| DE | 102006012336 A1 | 11/2006 |
| DE | 102009041587 A1 | 3/2011 |
| WO | 2012168180 A2 | 12/2012 |

\* cited by examiner

*Primary Examiner* — Dalena Tran
(74) *Attorney, Agent, or Firm* — Ingrassia Fisher & Lorenz PC

(57) ABSTRACT

A driver assistance device for a motor vehicle includes a control unit that is designed for delivering control signals for carrying out an autonomous parking maneuver to a drive and/or steering system of the motor vehicle. The driver assistance system is configured to abort a parking maneuver in progress when an abort command is received. A detection device for detecting an electrostatic field is connected to the control unit in order to generate the abort command.

20 Claims, 1 Drawing Sheet

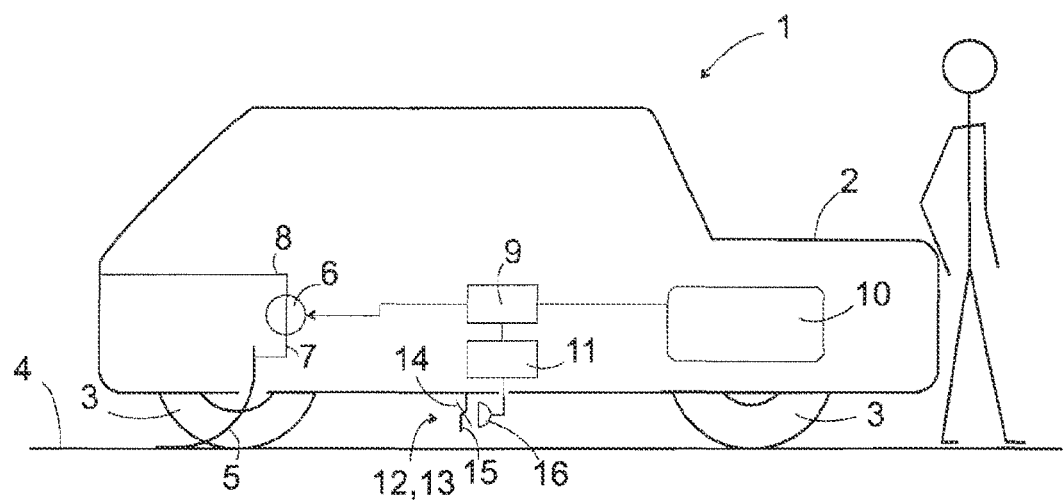

DRIVER ASSISTANCE DEVICE

CROSS REFERENCE TO RELATED APPLICATION

This application claims priority to German Patent Application No. 102013020199.3 filed Nov. 30, 2013, which is incorporated herein by reference in its entirety.

TECHNICAL FIELD

The present disclosure pertains to a driver assistance device, in particular, for assisting in a manually or autonomously controlled parking maneuver.

BACKGROUND

Assistance systems capable of determining the position of a vehicle relative to a parking space, configuring a path into the parking space and controlling the movement of the vehicle along this path without the assistance of a driver are generally known. However, these conventional assistance systems are unable to detect potential problems during a parking maneuver with the required reliability. As such, it is therefore still preferred that a person monitor the parking maneuver such that it can be aborted in case a critical situation arises.

For example, DE102009041587A1 discloses a driver assistance device for assisting in parking maneuvers, wherein a vehicle-based camera transmits images of the vehicle surroundings to a display screen of a remote control in order to enable the user to detect a critical situation such as, e.g., the vehicle approaching other persons and to abort the parking maneuver in case such a critical situation is detected.

One prerequisite for the effectiveness of this conventional assistance device is that the user attentively monitors the remote control such that the parking maneuver can be aborted in a timely fashion, if so required. However, the more reliable these assistance systems become, the higher the tendency of the users to rely on their correct operation and to no longer monitor the braking maneuver with the appropriate diligence. This means that particularly the high reliability of such assistance devices in standard situations can lead to the driver not reacting as required in a critical situation.

A manual parking maneuver controlled by a driver seated in the vehicle also needs to be attentively monitored. When the steering wheel is turned while backing into the parking space, the front section and the rear section of the vehicle move in opposite directions such that it is difficult for the driver to monitor all parts of the vehicle that may come in contact with external obstacles with the required diligence.

SUMMARY

The present disclosure therefore provides a driver assistance device that is capable of protecting the motor vehicle, as well as persons and objects in its surroundings, from injuries or damages in case of accidental contact.

According to an embodiment of the present disclosure, a driver assistance device for a motor vehicle is provided with a detection device for detecting an electrostatic charge of the motor vehicle relative so its surroundings and an evaluation unit that is connected to the detection device in order to generate an alert signal when the electrostatic charge dissipates.

According to an embodiment, the alert signal may simply prompt the driver to immediately stop the vehicle, but can also be directly used for automatically actuating the brakes of the vehicle.

The motor vehicle normally is electrically insulated from the ground underneath the motor vehicle by its tires. This makes it possible to electrostatically charge metallic components of the vehicle body relative to the surroundings, but this electrostatic charge can abruptly diminish or completely disappear if a person contacts the vehicle body and therefore allows the electrostatic charge to dissipate. An abrupt change of the electrostatic field therefore can be used for detecting accidental contact of the vehicle with a person outside the vehicle and for preventing endangerment of the person and/or the vehicle by aborting the parking maneuver in such instances. The detection device may include, in particular, an electric field meter or an electroscope.

An electrostatic charge of the motor vehicle may spontaneously occur in the driving mode; however, it is advantageous to provide an electrostatic generator in order to respectively generate the electrostatic field with suitable field intensity, if so required. A first pole of this electrostatic generator should be connected to an electrically conductive body of the motor vehicle because the electrostatic charge can, in case of accidental contact of the vehicle with a person, dissipate from the motor vehicle body via the person.

A second pole of the electrostatic generator should be connected with a ground contact element in order to deliver the electric charge to the ground. Such a ground contact element is generally known, for example, in the form of a flexible and electrically conductive plastic strap that is fixed on the vehicle and dragged on the ground. Although such a ground strap customarily serves for preventing an electrostatic charge of the vehicle body, it is in accordance with the present disclosure used for the exact opposite purpose.

The ground contact element does not have to constantly remain in conductive contact with the ground. Once this contact has existed for a brief period of time such that the vehicle body and the ground are charged with opposite signs, this ground contact is no longer required for detecting the contact with a person. In order to detect the electrostatic field generated by the charge, the electrostatic detection device should be arranged outside the vehicle body, experimentally between the vehicle body and the ground.

Such a driver assistance device may be coupled to a speedometer of the vehicle in order to be automatically activated when the vehicle speed falls short of a limiting value.

According to one embodiment, the driver assistance device may include a control unit that is designed for delivering control signals for carrying out an autonomous parking maneuver to a drive and/or steering system of the motor vehicle and connected to the evaluation unit in order to abort a parking maneuver in progress when an alert signal is received. The evaluation unit may be designed for detecting the dissipation speed of the electrostatic field. This makes it possible, in particular, to distinguish between an abrupt discharge due to accidental contact with a person or an object with similar or superior conductivity on the one hand and an accelerated dissipation of the electrostatic charge via the air, e.g. at a high relative humidity, on the other hand.

In case of an abrupt discharge, the vehicle should come to a standstill as quickly as possible; a gentler braking maneuver suffices when a slower discharge occurs. After a slow discharge, it is furthermore possible to automatically carry out a recharging process and to continue the parking maneuver;

when an abrupt discharge occurs, however, it should only be possible to continue moving the vehicle in response to a specific command by a user.

BRIEF DESCRIPTION OF THE DRAWINGS

The present disclosure will hereinafter be described in conjunction with the following drawing figures, wherein like numerals denote like elements.

FIG. 1 shows a schematic representation of a motor vehicle that is equipped with an inventive driver assistance device.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The motor vehicle 1 illustrated in FIG. 1 has a vehicle body 2 that, with the exception of window surfaces, essentially consists of an electrically conductive metal. The vehicle body 2 is electrically insulated from the ground 4 by tires 3 of front and rear wheels. A ground strap 5 consisting of rubber or a similar material, which is rendered electrically conductive by means of a suitable additive or incorporated metal wires, is fixed on the vehicle 1 such that it is insulated from the vehicle body 2 and drags on the ground 4 while the vehicle is in motion. The ground strap 5 is connected to one pole 7 of an electrostatic generator 6. A second pole 8 of the generator 6 is connected to the vehicle body 2. The electrostatic generator 6 used may include a generally known Van-de-Graaff generator, but is preferably realized in the form of a high-voltage source that is supplied with power by the battery of the vehicle 1 such as, e.g., a clocked voltage up-converter or a charge pump. The requirements with respect to the secondary current intensity of the generator 6 are minimal. Secondary voltage should be sufficient for penetrating a paint layer that usually covers the vehicle body 2 when it is touched by an electrically conductive object or a person.

The operation of the electrostatic generator 6 may be coupled to a (not-shown) speedometer in order to electrostatically charge the vehicle body 2 when the speed drops below a predefined limiting value. This makes it possible to ensure that the vehicle body 2 is charged when the vehicle moves with a slow speed that is typical for a manual parking maneuver. A detection device 12 for detecting the electrostatic field is connected to an evaluation unit 11 in order to generate an alert signal when a collapse of the electrostatic charge indicates accidental contact of the vehicle body 2 with an object or a person outside the vehicle. The evaluation unit 11 may be connected to an alarm such that the alert signal can be perceived by the driver. However, it may also be connected to and automatically actuate a drive system 10 of the vehicle, particularly its brakes, in order to thusly bring the vehicle to a standstill.

According to one enhancement, the operation of the electrostatic generator 6 is controlled by an electronic control unit 9 that is also connected to the engine, the steering system and the brakes of the vehicle that are jointly referred to as the drive system 10 in order to autonomously plan and control a parking maneuver in response to a command by a user. The control unit 9 is connected to the detection device 12 via the evaluation unit 11.

The detection device 12 should be arranged outside the vehicle body 2 because its interior is essentially field-free. The detection device 12 is preferably arranged underneath the vehicle body 2 because the electrostatic field is in the case of a static charge of the vehicle body 2 most intense between the vehicle body and the ground 4.

The detection device 12 illustrated in the FIGURE includes a generally known double pointer electroscope 13. A double pointer 14 is fixed on a rod 15 that is conductively connected to the vehicle body 2 rotatably, namely about an axis extending almost through its center of gravity, such that an electrostatic charge of the vehicle body 2 also propagates to the electroscope 13 and the repulsion between the charges of the same sign distributed over the double pointer 14 and the rod 15 deflects the double pointer 14 relative to the rod 15. A contactless sensor, preferably an optical sensor 16, is provided for detecting the position of the double pointer 14.

Instead of using an electroscope 13, it would also be possible to provide a detection device 12 in the form of an electric field meter that is also referred to as a field mill. Such a field mill contains several electrodes that are alternately shielded from an external electrostatic field by a rotating impeller. The thusly induced potential fluctuations in the electrodes are electronically amplified in order to deliver a measure for the intensity of an electrostatic field, in which the field mill is arranged. In contrast to the electroscope, the field mill directly delivers an electrical signal that can be processed by the evaluation unit 11 without prior conversion by a sensor.

When the control unit 9 receives a parking command from the user, it initially activates the electrostatic generator 6 until the detection device 12 indicates that an electrostatic field of sufficient intensity is present. The control unit 9 only actuates the drive system 10 once this is the case in order to set the vehicle in motion along the previously configured path.

The times, at which the vehicle 1 stops along this path, e.g., in order to shift between forward and reverse gears, can be used for restoring an electrostatic charge of the vehicle body 2 that meanwhile may have diminished. This may be required, in particular, if the vehicle practically discharges completely before the parking maneuver can be completed, e.g. due to high relative humidity.

In case of accidental contact of the vehicle body 2 with a person 17, the electrostatic charge of the vehicle body 2 abruptly discharges to the ground 4 via the person 17. The collapse of the electrostatic field is detected by the detection device 12 and prompts the evaluation unit 11 to deliver a command for aborting the parking maneuver to the control unit 9. The control unit then actuates the brakes in order to abruptly bring the vehicle 1 to a standstill. Once the vehicle body is no longer in contact with the person 17, the user can once again issue a parking command such that the vehicle body 2 initially is electrostatically recharged before the vehicle 1 is set in motion.

If the discharge of the vehicle is not caused by accidental contact with a person 17, but rather charge dissipation via the air, the above-described vehicle could also come to a standstill and would require a user command for continuing the parking maneuver. This may be prevented by designing the evaluation unit 11 such that it can distinguish between a slow discharge via the air and an abrupt discharge due to accidental contact with a person. This can simply be realized by defining two limiting values of the electrostatic field. The discharge is slow if the interval between the times, at which the electrostatic field falls short of the upper and the lower limiting value, is sufficiently long for activating the electrostatic generator 6 and otherwise abrupt. In case of a slow discharge, the operation of the generator 6 prevents that the lower limiting value is reached. The conditions for aborting the parking maneuver are not fulfilled and the parking maneuver can be completed as planned.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A driver assistance device for a motor vehicle comprising:
   a detection device for detecting an electrostatic charge of the motor vehicle relative to its surroundings; and
   an evaluation unit operably connected to the detection device and configured to generate an alert signal when the electrostatic charge dissipates as the motor vehicle engages in an autonomous parking maneuver.

2. The driver assistance device according to claim 1, wherein the detection device comprises an electric field meter.

3. The driver assistance device according to claim 1, wherein the detection device comprises an electroscope.

4. The driver assistance device according to claim 1 further comprising an electrostatic generator.

5. The driver assistance device according to claim 4, wherein the electrostatic generator comprises a first pole that is connected to an electrically conductive body of the motor vehicle.

6. The driver assistance device according to claim 5, wherein the electrostatic generator further comprises a second pole connected to a ground contact element.

7. The driver assistance device according to claim 6, wherein the ground contact element is electrically insulated from the vehicle body.

8. The driver assistance device according to claim 1, wherein the detection device is arranged outside a body of the vehicle.

9. The driver assistance device according to claim 1, wherein the detection device is arranged between a body of the vehicle and a ground.

10. The driver assistance device according to claim 1, wherein the driver assistance device is coupled to a speedometer, wherein the driver assistance device is automatically activated when a speed indicated by the speedometer is less than a limiting value.

11. The driver assistance device according to claim 1 further comprising a control unit configured to deliver a control signal for carrying out the autonomous parking maneuver to at least one of a drive system and a steering system of the motor vehicle, wherein the control unit is operably connected to the evaluation unit in order to abort the autonomous parking maneuver in progress when the alert signal is received.

12. The driver assistance device according to claim 11, wherein the evaluation unit is configured to detect the dissipation rate of the electrostatic charge for distinguishing between a slow discharge and an abrupt discharge.

13. The driver assistance device according to claim 12, wherein the control unit is configured to decelerate the vehicle at a faster rate than in the case of a slow discharge when an abrupt discharge occurs.

14. The driver assistance device according to claim 12, wherein the control unit is configured to operate an electrostatic generator in the case of a slow discharge such that the electrostatic field is restored and the parking maneuver is continued.

15. The driver assistance device according to claim 11, wherein the control unit is configured to permit the parking maneuver to continue in response to a corresponding user input after an abrupt discharge.

16. A driver assistance device for a motor vehicle comprising:
   a detection device for detecting an electrostatic charge of the motor vehicle relative to its surroundings;
   an evaluation unit operably connected to the detection device and configured to generate an alert signal when the electrostatic charge dissipates; and
   a control unit configured to deliver a control signal for carrying out an autonomous parking maneuver to at least one of a drive system and a steering system of the motor vehicle, wherein the control unit is operably connected to the evaluation unit in order to abort a parking maneuver in progress when the alert signal is received.

17. The driver assistance device according to claim 16, wherein the evaluation unit is configured to detect the dissipation rate of the electrostatic charge for distinguishing between a slow discharge and an abrupt discharge.

18. The driver assistance device according to claim 17, wherein the control unit is configured to decelerate the vehicle at a faster rate than in the case of a slow discharge when an abrupt discharge occurs.

19. The driver assistance device according to claim 17, wherein the control unit is configured to operate an electrostatic generator in the case of a slow discharge such that the electrostatic field is restored and the parking maneuver is continued.

20. The driver assistance device according to claim 16, wherein the control unit is configured to permit the parking maneuver to continue in response to a corresponding user input after an abrupt discharge.

* * * * *